(12) United States Patent
Kikuchi et al.

(10) Patent No.: US 8,959,908 B2
(45) Date of Patent: Feb. 24, 2015

(54) BRAKE CONTROLLER

(75) Inventors: Kenji Kikuchi, Isesaki (JP); Daisuke Yasukawa, Hitachinaka (JP); Hirofumi Watanabe, Isesaki (JP); Takuya Obata, Minamiarupusu (JP); Takayuki Ohno, Yokohama (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 876 days.

(21) Appl. No.: 13/132,434

(22) PCT Filed: Nov. 30, 2009

(86) PCT No.: PCT/JP2009/070093
§ 371 (c)(1),
(2), (4) Date: Jul. 12, 2011

(87) PCT Pub. No.: WO2010/064593
PCT Pub. Date: Jun. 10, 2010

(65) Prior Publication Data
US 2011/0259005 A1    Oct. 27, 2011

(30) Foreign Application Priority Data

Dec. 4, 2008  (JP) ................................. 2008-309228

(51) Int. Cl.
*B60T 13/74*   (2006.01)
*B60T 13/66*   (2006.01)
*B60T 8/36*    (2006.01)

(52) U.S. Cl.
CPC ............... *B60T 13/662* (2013.01); *B60T 8/368* (2013.01); *B60T 13/745* (2013.01)
USPC ............................................. 60/545; 60/538

(58) Field of Classification Search
CPC .................................................... B60T 13/745
USPC ................................................. 60/538, 545
See application file for complete search history.

(56) References Cited

U.S. PATENT DOCUMENTS

| 8,011,184 B2 * | 9/2011 | Ohtani et al. ................... 60/545 |
| 8,387,381 B2 | 3/2013 | Ohno et al. |
| 2008/0295512 A1 | 12/2008 | Obata et al. |

FOREIGN PATENT DOCUMENTS

| CN | 101407218 A | 4/2009 |
| DE | 10 2009 000 481 A1 | 8/2009 |

(Continued)

OTHER PUBLICATIONS

Corresponding International Search Report (Form PCT/ISA/210) dated Mar. 2, 2010 with English Translation (Two (2) pages).
(Continued)

*Primary Examiner* — Thomas E Lazo
(74) *Attorney, Agent, or Firm* — Crowell & Moring LLP (57) ABSTRACT

Provided is a brake controller which can be made smaller. The brake controller (100) has a hydraulic control mechanism (150), which comprises a master cylinder (250) which generates a hydraulic fluid pressure on the basis of an input piston (182) and a control piston (190) that move when a braking operation is performed, motors (290, 296), and a moving mechanism (200) which moves the aforementioned control piston as the aforementioned motors turn, and a motor control unit (300) for regulating the turning of the aforementioned motors. The brake controller is characterized in that the aforementioned motor control unit (300) has a metal case (302) with a built-in control circuit, the aforementioned metal case (302) is affixed to the housing (160) of the aforementioned moving mechanism (200), one end of the aforementioned case (302) is placed at approximately the same position as an end of the aforementioned moving mechanism (200) in the axial direction of the aforementioned input piston (182), and the other end of the aforementioned case (302) is placed at approximately the same position as an end of the aforementioned master cylinder (250).

8 Claims, 11 Drawing Sheets

(56) References Cited

FOREIGN PATENT DOCUMENTS

| EP | 1 997 702 A1 | 12/2008 |
| JP | 10-257708 A | 9/1998 |
| JP | 2007-191133 A | 8/2007 |
| JP | 2008-296782 A | 12/2008 |

OTHER PUBLICATIONS

German Office Action dated Oct. 17, 2014 with partial English translation (seven pages).

* cited by examiner

BRAKE CONTROLLER

TECHNICAL FIELD

The present invention relates to a controller for use in brakes.

BACKGROUND ART

As controllers for controlling traveling of movable bodies such as vehicles, there is a brake controller, which generates a braking force on the basis of an operation by a driver. Brake controllers involve a high fear of a serious accident when failure happens and so are demanded of high reliability. In brake controllers, there is mainly used a construction, in which hydraulic pressure generates a braking force in order to maintain a high reliability. Hydraulic pressure is generated on the basis of the braking operation by a driver and, for example, a wheel cylinder of a braking system is driven on the basis of the hydraulic pressure to generate a braking force.

A large braking force is needed to stop a vehicle and there is adopted a construction, in which a large hydraulic pressure is generated on the basis of a brake operating force by a driver to generate a large braking force. There is contrived a construction, in which a motor is controlled on the basis of the brake operation by a driver and torque generated by the motor generates a large braking force. Such technology is disclosed in, for example, Patent Literature 1.

CITATION LIST

Patent Document

[Patent Literature 1] JP-A-2007-191133

SUMMARY OF INVENTION

Technical Problem

Brake controllers comprise a mechanism for controlling hydraulic pressure and a motor control unit for controlling a motor. It is desirable to accommodate a brake controller in a small space as far as possible. Therefore, it is desirable to restrain from getting bigger of a brake controller including a mechanism for controlling hydraulic pressure and a motor control unit.

It is an object of the invention to provide a brake controller, which can restrain from getting bigger in size, as far as possible.

Solution to Problem

One of brake controllers, which solve the above-described problem, has the following construction.

A brake controller comprises a mechanism for controlling hydraulic pressure and a motor control unit, the mechanism for controlling hydraulic pressure comprises a housing, a master cylinder arranged on one side and a moving mechanism arranged on the other side, the motor control unit comprises a case having a cooling function, electric components of the motor control unit are accommodated in the case, and the case is fixed on the housing of the mechanism for controlling hydraulic pressure.

Another of brake controllers, which solve the above-described problem, has the following construction.

A brake controller comprises a mechanism for controlling hydraulic pressure and a motor control unit, the hydraulic pressure control mechanism comprises a master cylinder arranged on one side and an input piston, a control piston and a moving mechanism to move the control piston, which are arranged on the other side, the motor control unit has a metal case for cooling, an end face of the metal case on one side is positioned at substantially the same position of an end portion of the master cylinder and an end face of the metal case on the other side is positioned at substantially the same position of an end portion of the moving mechanism.

Advantageous Effects of Invention

According to the invention, it is possible to inhibit brake controllers from becoming large in size.

Other objects, features and advantages of the present invention will become apparent from the following description of the embodiments of the invention taken in conjunction with the accompanying drawings.

DESCRIPTION OF EMBODIMENTS

A brake controller described hereinafter has improvements taking into consideration various needs demanded thereof as a product and the problem described in the column of [Technical Problem] is one of the needs. Main problems, which are to be solved by a brake controller described hereinafter, are listed as follows.

[Restraining from Getting Bigger]

A case of a motor control unit is long in shape in a direction of an axis of an input piston and shaped in conformity to a space required for a mechanism for controlling hydraulic pressure. Therefore, the brake controller is restrained from getting bigger in volume.

The case of the motor control unit is fixed to a housing of a moving mechanism, in which a motor is built, a hole for communication between the housing and the case is formed, and ac power is supplied through the hole and therefore, the brake controller is restrained from getting bigger in volume.

A space is formed between the case of the motor control unit and a master cylinder and a connection of an fluid passage of a reservoir and the master cylinder is formed in the space, and therefore, the brake controller is restrained from getting bigger in volume. Also, a part of the reservoir is arranged in the space and therefore, the brake controller is restrained from getting bigger in volume.

[Improvement in Cooling Effect]

A brake controller comprises a mechanism for controlling hydraulic pressure and a motor control unit, the hydraulic pressure control mechanism includes a master cylinder arranged on one side and an input piston, a control piston and a moving mechanism for moving the control piston, which are arranged on the other side, the motor control unit includes a metal case for cooling, and the metal case is long in shape in a direction of an axis of the input piston of the hydraulic pressure control mechanism so that an end thereof on one side is positioned at substantially the same position as that of an end of the master cylinder and an end thereof on the other side is positioned at substantially the same position as that of an end of the moving mechanism. Further, fins are formed on an outside of the case. Since a length in the direction of the axis of the input piston of the hydraulic pressure control mechanism is made use of to form cooling fins, a large cooling area can be ensured to achieve an improvement in cooling effect.

An improvement in cooling effect is achieved since a space is formed between the case of the motor control unit and the master cylinder and cooling fins are formed on a side of the case toward the master cylinder.

An improvement in cooling effect is achieved since a semiconductor device, which constitutes an inverter circuit, is arranged on a side of the motor control unit toward the master cylinder in a direction of the axis of the input piston of the hydraulic pressure control mechanism and a space and cooling fins are formed between the metal case of the motor control unit and the master cylinder.

[Improvement in Productivity]

A housing of a movable body for moving a control piston on the basis of motor output is fixed to a vehicle body, and the master cylinder and the motor control unit are fixed to the housing. Therefore, it is possible to fix the motor control unit, into which important parts are assembled, to the housing, so that an improvement in productivity is achieved.

An improvement both in productivity and in reliability is achieved since the motor control unit is beforehand manufactured in a production line of electronic parts and thereafter the motor control unit is fixed to the housing of the movable body.

An improvement in productivity is achieved since the hydraulic pressure control mechanism is assembled by fixing the reservoir to the master cylinder and fixing the master cylinder, to which the reservoir is fixed, to the housing of the movable body.

The motor control unit is fixed offset in a direction crossing the axis of the input piston to form a space on one side of the axis. A connector is provided to face the space, thus enabling making use of the space to perform the connecting work of the connector. Therefore, there is produced an effect that the connecting work of the connector is easy to perform.

[Improvement in Reliability]

Since a fluid passage for interconnecting the reservoir and the master cylinder is formed in a space formed between the master cylinder and the metal case of the motor control unit, the fluid passage is hard to undergo a mechanical damage. The possibility that the master cylinder and the motor control unit are arranged in an engine room is very high. In repair and inspection of an engine, there is possibility that a tool comes into contact with them but the possibility that the fluid passage undergoes a mechanical damage is very low since a space formed between the master cylinder and the metal case allows possibility that a tool, etc. come into contact it is very low.

A hole communicated to the metal case of the motor control unit and a metal housing of the moving mechanism, in which the motor is built, is formed and a signal of the resolver is fed to the motor control unit through the hole from the moving mechanism. Owing to this construction, the signal of the resolver is hardly influenced by noise, so that a high reliability is obtained.

Figure 1:
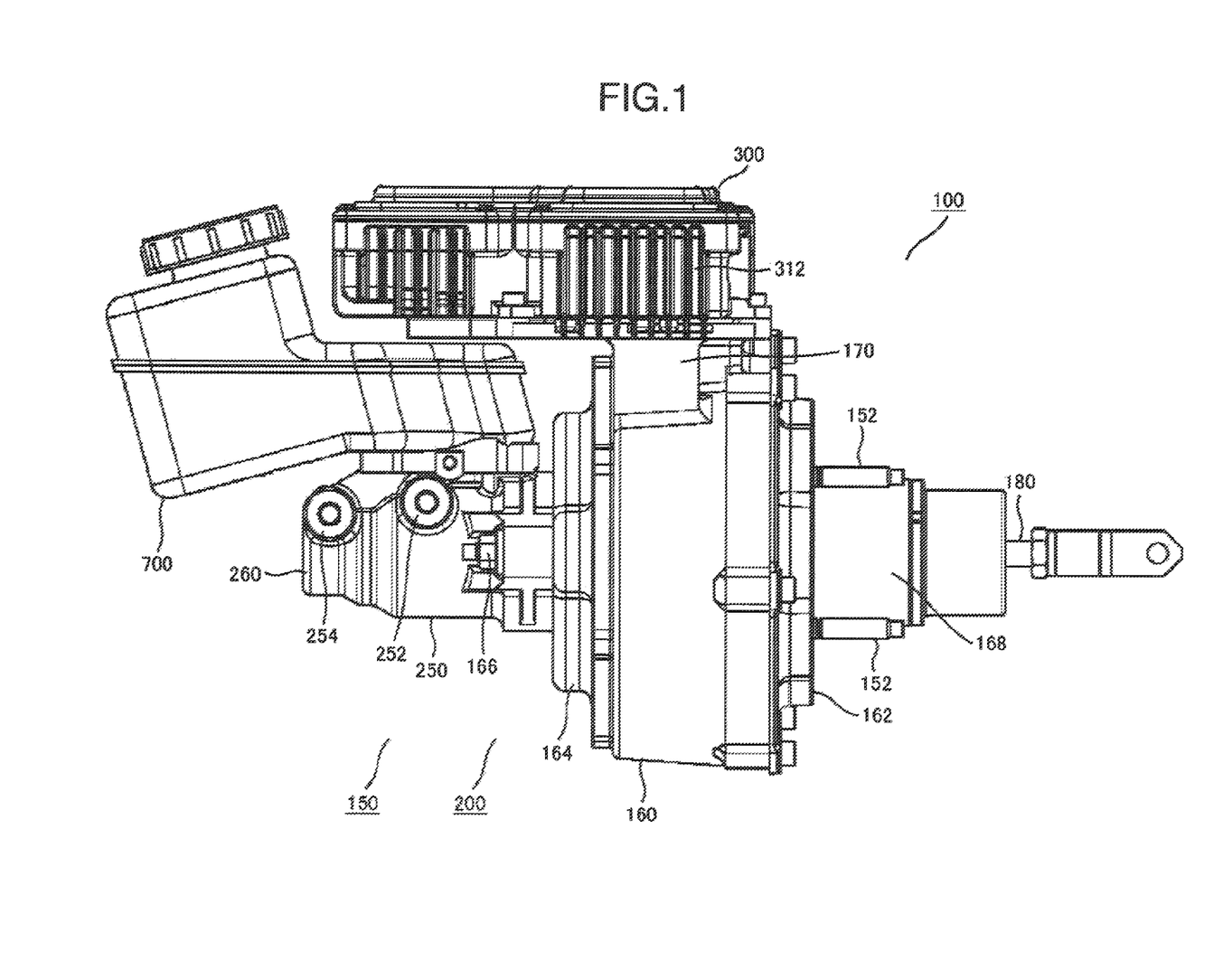
FIG. 1 is a side view of a brake controller according to an embodiment of the invention.
Figure 2:
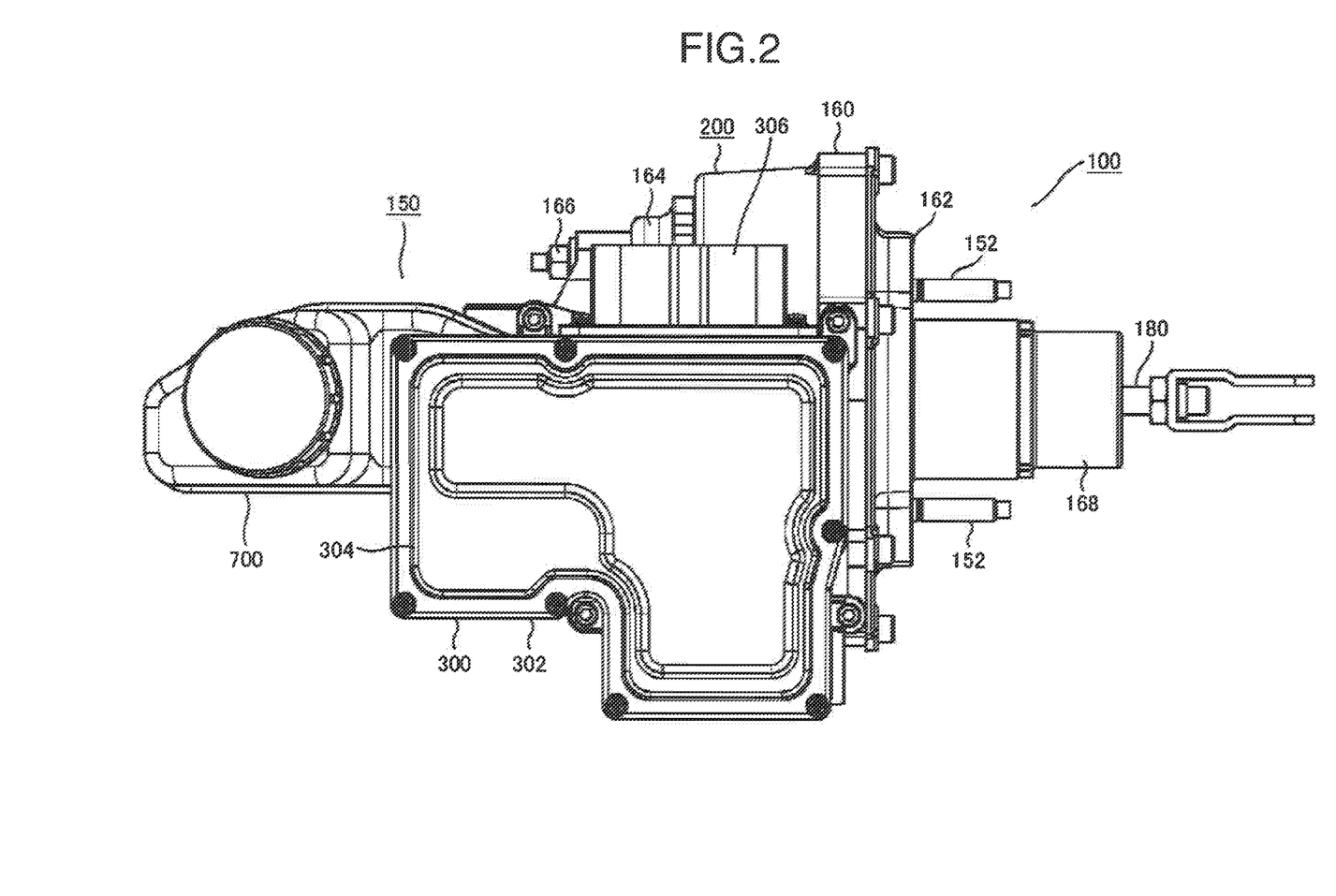
FIG. 2 is a top view of the brake controller according to the embodiment of the invention.
Figure 3:
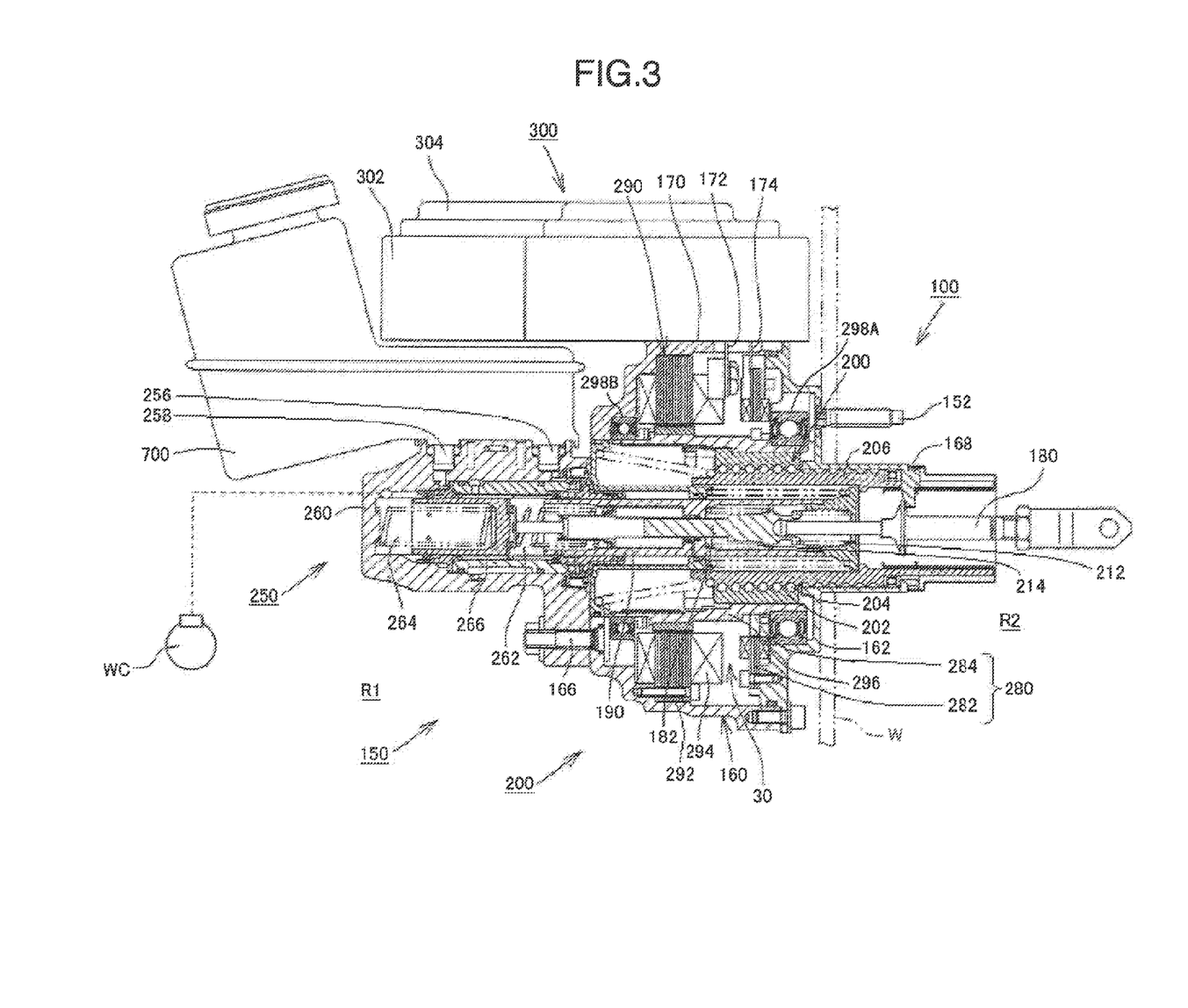
FIG. 3 is a partially cross sectional view of the brake controller.

An embodiment of a brake controller according to the invention will be described hereinafter with reference to FIGS. 1 to 3. FIG. 1 is a side view of a brake controller 100, FIG. 2 is a top view of the brake controller 100, and FIG. 3 is a partial cross sectional side view illustrating an internal construction of a hydraulic pressure control mechanism 150 of the brake controller. In addition, while a motor control unit 300 is formed on an outer surface thereof with fins for heat radiation as shown in FIG. 1, depiction of the fins is omitted with a view to avoidance of complexity.

The brake controller 100 comprises the hydraulic pressure control mechanism 150, which generates hydraulic pressure for brake control on the basis of an operation amount of a brake pedal, the motor control unit 300 for controlling a motor and a reservoir 700, in which a working fluid is stored. The hydraulic pressure control mechanism 150 is fixed to a partition wall W, which partitions an engine room R1 and a vehicle interior R2, by bolts 152 as shown in FIG. 3. A motor is received in an interior of a housing 160 of the hydraulic pressure control mechanism 150. The hydraulic pressure control mechanism 150 includes a master cylinder 250 and the reservoir 700 on one side thereof in a direction of rod axis. The reservoir 700 is provided above the master cylinder 250 in order to avoid entry of an air into the working fluid and to facilitate letting an air, which has already entered into the working fluid, out. By arranging the reservoir 700 along and above the master cylinder 250, it is possible to decrease a space occupied by the whole of the brake controller 100. Further, the motor control unit 300 is arranged on the same side as that, on which the reservoir 700 is provided, relative to the hydraulic pressure control mechanism 150, that is, on an upper side in the embodiment. Such arrangement makes it possible to decrease a space occupied by the whole of the brake controller 100. In the embodiment, by fixing the housing 160 of the hydraulic pressure control mechanism 150 to the partition wall W and fixing the reservoir 700, the motor control unit 300 and the master cylinder 250 to the housing 160, the master cylinder 250, the reservoir 700 and the motor control unit 300 are fixed to a vehicle body. By adopting such construction, mounting to the vehicle body is made simple. Further, it becomes possible to manufacture the motor control unit 300 in a separate process to thereafter fix the same to the housing 160, so that an improvement in reliability is achieved together with an improvement in productivity.

The hydraulic pressure control mechanism 150 includes the master cylinder 250 and a moving mechanism 200 having the housing 160 in the form of a cylinder, an opening is formed on the housing 160 to permit the motor, a piston described later, etc. to be mounted therein, and a cover 162 is provided on the housing 160 to close the opening. A stepped wall 164 is provided on a side of the housing 160 toward the master cylinder 250 and the master cylinder 250 is fixed to the wall 164 of the housing 160 by bolts 166. On the other end side of the housing 160, the opening is formed and the cover 162 is provided to close the opening. The cover 162 includes a rod cover 168 extending in a direction of rod axis described later, and the rod cover 168 protrudes into the vehicle interior R2 through an opening formed on the partition wall W. In the embodiment, the rod cover 168 is cylindrical-shaped for the sake of an improvement in productivity and reliability, and an input rod 180, which is moved axially on the basis of operation of the brake pedal, extends in an interior of the rod cover 168. As described above, by fixing the cover 162 to the partition wall W shown in FIG. 3, the housing 160 is fixed to the vehicle body.

As described above, since the motor control unit 300 and the master cylinder 250 are fixed to the housing 160 of the moving mechanism 200 fixed to the vehicle body, it becomes possible to individually produce or assemble the master cylinder 250, the reservoir 700 and the motor control unit 300 to thereafter fix them to the housing 160, so that it is possible to achieve an improvement in productivity. In particular, since the motor control unit 300 can be assembled in a production line of electronic parts and thereafter fixed to the hydraulic pressure control mechanism 150, an improvement in reliability is achieved in addition to an improvement in productivity.

Further, after the reservoir 700 and the master cylinder 250 are assembled integrally, the assembly can be fixed to the housing 160 of the hydraulic pressure control mechanism 150, so that after the passage of the working fluid of the reservoir 700 and the master cylinder 250 are coupled together, or inspection of, for example, leakage of the working fluid is further performed as needed, and thereafter the master cylinder 250 can be fixed to the housing 160. Owing to such construction, an improvement in reliability can be achieved in addition to an improvement in productivity.

While details will be described later, the motor control unit 300 includes a metal case 302 and a control circuit having an inverter circuit for controlling the motor provided in the moving mechanism 200 is received in the case 302. The motor control unit 300 converts dc power into ac power, the ac power being supplied to a stator 174 of the motor received in the interior of the housing 160 of the hydraulic pressure control mechanism 150. In addition, the case 302 of the motor control unit 300 is provided with a metal lid 304 and many fins 312 for cooling are formed on a bottom and an outer periphery of the case 302. While the fins 312 are shown in FIGS. 1 and 2, depiction of the fins 312 is omitted for the sake of avoidance of complexity. The motor control unit 300 is provided on a side thereof with a connector 306 for reception of dc power from a power supply, control commands from a vehicle control unit and state signals from sensors. A communication line for transmission and receipt of information from other equipment is connected to the connector 306.

As shown in FIG. 2, the motor control unit 300 is arranged in a direction crossing an axis of the input rod 180 of the hydraulic pressure control mechanism 150, and arranged downwardly offset in the drawing. That is, the motor control unit is arranged offset toward a working fluid discharge port of a master cylinder described later, and the offset forms a space on a side of the motor control unit 300 toward the connector 306. Owing to such arrangement, mounting and dismounting of the connector 306 are facilitated. Also, even when various equipments are present around, a working space for mounting and dismounting of the connector 306 is ensured and influences of other equipment are decreased.

The case 302 of the motor control unit 300 is long in shape, so that it is possible to ensure a fair receiving volume even when a length in a direction crossing an axis of the input piston is made short. Further, an area of radiation of heat generated in the interior can be ensured. An axial direction of the input piston of the motor control unit 300 is along a space required for the hydraulic pressure control mechanism 150, so that by making use of a length in the axial direction for securement of a receiving volume and for securement of a heat radiating area, it is possible to restrict an increase in a whole volume of the brake controller, thus enabling decreasing influences on other equipment.

A holding base 170 is formed on an outside of the housing 160 of the hydraulic pressure control mechanism 150 toward the reservoir 700, and the case 302 of the motor control unit 300 is fixed to the holding base 170. Grease for good heat conduction is applied between the holding base 170 and the case 302. In addition, a heat conductive sheet having excellent heat conduction may be provided.

As shown in FIG. 1, the motor control unit 300 is held offset toward the partition wall W (see FIG. 3). A surface of the motor control unit 300 toward the partition wall W is positioned at substantially the same position as that of an end surface of the housing 160 of the moving mechanism 200 in the axial direction of the input piston of the motor control unit 300, and the opposite surface is positioned at substantially the same position as that of an end of the master cylinder 250. In this manner, since the case 302 of the motor control unit 300 is long in shape in the axial direction of the input piston of the hydraulic pressure control mechanism 150, a large heat radiating area can be secured and the motor control unit 300 is adequately cooled. Further, a space is formed between the master cylinder 250 and the case 302 of the motor control unit 300. In the case where fins for cooling are formed on a side of the case 302 toward the master cylinder 250, wind flowing through the space can cool heat generated in an interior of the motor control unit 300. The fins are preferably formed in alignment with the axial direction of the input piston in order to make a flow of cooling wind a flow along the axial direction, in which a large cooling effect is produced.

A switching semiconductor device, described later, for conversion of dc power into ac power is provided in the interior of the motor control unit 300, and heat is generated accompanying the power conversion. The generated heat is conducted to the housing 160 of the moving mechanism 200 through the holding base 170 from the case 302 to be cooled. Further, the fins 312 are formed on the case 302 of the motor control unit 300 as described above and cooling is accomplished by heat radiation through the fins 312. Owing to such construction, an improvement in cooling efficiency is achieved to enable an adequate cooling, thus achieving an improvement in reliability. Also, the reservoir 700 is provided in the space between the case 302 of the motor control unit 300 and the master cylinder 250 and a construction for supply of the working fluid to the master cylinder 250 from the reservoir 700 is further provided. Since the space between the case 302 of the motor control unit 300 and the master cylinder 250 is made use of as a space for formation of a supply passage of the working fluid to the master cylinder 250 from the reservoir 700, utilization efficiency of the space is improved to lead to inhibition of the brake controller 100 from becoming large in size.

Further, there is possibility that various services such as repair, inspection, etc. are performed in an interior of the engine room, and there is possibility that at that time a tool and other equipment strike against the brake controller 100. Since the metal case 302 of the motor control unit 300 is present above the supply passage of the working fluid to the master cylinder 250 from the reservoir 700 and a stationary part of the reservoir 700, it is possible to protect the supply passage or the stationary part of the reservoir 700, so that an improvement in reliability is achieved.

Subsequently, referring to FIG. 3, the construction of the hydraulic pressure control mechanism 150 of the brake controller 100 will be described. The brake controller 100 operates as a booster. An input rod side of the hydraulic pressure control mechanism 150 protrudes into the vehicle interior through the opening of the partition wall W to be connected mechanically to the brake pedal (not shown) and the input rod 180 is moved toward the master cylinder on the basis of an operation amount of the brake pedal. An input piston 182 is moved toward the master cylinder on the basis of movement of the input rod 180. The master cylinder 250 includes a housing 260 formed therein with a cylindrical-shaped hole, and the hole is formed with two pressure chambers 262, 264. A free piston 266 is provided between the two pressure chambers 262, 264, the pressure chamber 262 is formed on the other side of the free piston 266 and the pressure chamber 264 is formed on one side of the free piston 266. The free piston 266 fundamentally moves so that pressures in the pressure chamber 262 and the pressure chamber 264 become substantially the same. Since the working fluid in the pressure chamber 262 is supplied from a discharge port 252 (FIG. 1) and the working fluid in the pressure chamber 264 is supplied from a discharge port 254 (FIG. 1), the working fluid of substantially the same pressure is supplied from the discharge port 252 and the discharge port 254.

When the input piston 182 is moved toward the master cylinder on the basis of an operation amount of the brake pedal, pressure in the pressure chamber 262 increases on the basis of movement of the input piston 182. Such increase in pressure causes the free piston 266 to move toward the pressure chamber 264 and the working fluid in the pressure chamber 264 is likewise increased in pressure. The working fluid under the increased pressure is fed to a hydraulic pressure control unit from the discharge ports 252, 254 and fed to wheel cylinders WC of brakes provided on respective wheels of a vehicle from the hydraulic pressure control unit to generate braking forces. Since only an operating force of the brake pedal is difficult to generate a fair pressure of the working fluid, a control piston 190 is provided and a motor and a direct acting mechanism for control of movement of the control piston 190 are provided in the embodiment shown in FIG. 3.

The motor includes a stator 290 and a rotor 296, and the rotor 296 is rotatably supported by a bearing 298A held on the cover 162 of the moving mechanism 200 and a bearing 298B held on the housing 160 of the moving mechanism 200. When ac power is supplied from the motor control unit 300 to the stator 290, the rotor 296 is rotated on the basis of the ac power as supplied. The stator 290 includes a stator core 292 and a stator winding 294 wound round the stator core 292. The rotor includes a permanent magnet opposed the stator core 292, and the permanent magnet forms a magnetic pole of the rotor 296. A position of the magnetic pole of the rotor 296 is detected by a resolver 280 to be fed to the motor control unit 300, and the motor control unit 300 generates ac power on the basis of the magnetic pole position of the rotor 296 to feed the same to the stator winding 294 through a power bus bar 172. The resolver 280 includes a resolver rotor 284, which is provided on the rotor 296 to rotate together with the rotor 296, and a resolver stator 282, which detects the rotating position of the resolver rotor 284, and a signal indicative of a position of the magnetic pole of the rotor 296 is output to the motor control unit 300 through a signal conductor 174 from the resolver stator 282.

The rotor 296 of the motor is hollow-shaped, the moving mechanism 200, which changes a motor torque into an axial force, is provided inside the rotor 296, and the control piston 190 is moved axially on the basis of torque generated by the motor. The moving mechanism 200 includes a nut member 202 fixed to the hollow rotor 296, balls 204, and a screw member 206, and when the rotor 296 of the motor rotates, the nut member 202 rotates. The hollow screw member 206, which engages with the nut member 202 through the balls 204, moves axially according to a direction of rotation of the nut member. A typical one among various methods of controlling the control piston 190 will be described hereinafter.

It is assumed that the input piston 182 is moved toward the master cylinder 250 by operation of the brake. Movement of the input piston 182 gives rise to a difference in the positional relationship between the input piston 182 and the control piston 190. When the motor is controlled so as to remove such difference, the nut member 202 is rotated by torque of the motor and the screw member 206 in engagement with the nut member 202 is moved axially toward the master cylinder. Forces of both the input piston 182 and the control piston 190 apply on the working fluid in the pressure chamber 262 of the master cylinder, so that the working fluid in the pressure chamber 262 is increased in pressure and the working fluid in the pressure chamber 264 is likewise increased in pressure by the action of the free piston 266. A braking force of the brake is generated on the basis of hydraulic pressures in the pressure chambers 262, 264. Return springs, which provide for bias in a backward direction at all times, respectively, are arranged in the pressure chambers 262, 264. When operation of the brake pedal is terminated and a push on the brake pedal disappears, the input piston 182 and the control piston 190 are returned to original positions thereof by the return springs as well as forces of hydraulic pressures, and the pressure of the working fluid is restored to a state before control of braking.

Assuming that the input piston 182 and the control piston 190 are moved toward the master cylinder at the same speed, a force given by pressure of the working fluid is based on a pressure receiving area perpendicular to an axis and when an area of the control piston 190 perpendicular to an axis thereof is made larger than an area of the input piston 182 perpendicular to an axis thereof, the working fluid can be heightened in pressure by a force, which is several times as large as a force for pushing the input piston 182, so that it is possible to generate a large braking force. Also, when the control piston 190 is moved toward the master cylinder at a larger speed than the moving speed of the input piston 182, it is possible to generate a large braking force for a slight operation amount. On the other hand, when the control piston 190 is moved slowly as compared with the moving speed of the input piston 182 or moved in a reverse direction, it is possible to restrict generation of a braking force to a small extent relative to the shift of the input piston 182. For example, in the case where a vehicle running motor for running of a vehicle performs regenerative braking on the basis of operation of the brake pedal to convert the kinetic energy of the vehicle into electric power, a braking force is generated by the vehicle running motor. In this case, a braking force based on pressure of the working fluid may be small, or is dispensed with, and therefore, the control piston 190 is moved slowly as compared with the movement of the input piston 182, or moved in a reverse direction to the movement of the input piston 182.

In a state, in which the brake pedal is not stepped on, that is, at the time of non-operation of a brake, the input piston 182 is disposed in a position of non-operation, and the control piston 190 for controlling hydraulic pressure of the working fluid in the master cylinder 250 is disposed in a position of non-operation. Since the control piston 190 and the input piston 182 are disposed in the positions of non-operation, the free piston 266 is disposed in a position of non-operation. Since the control piston 190 and the free piston 266 are disposed on a side of the brake pedal or in the positions of non-operation as described above, relief ports 256, 258 of the pressure chambers 262, 264 are put in an opened state and the pressure chambers 262, 264 are put in communication with a reservoir 3 via the relief ports 256, 258, and the respective pressure chambers 262, 264 are filled with the working fluid of the reservoir 3. When the brake pedal is stepped on and the input piston 182 and the control piston 190 are moved toward the master cylinder, passages, which provide for communication between the pressure chambers 262, 264 and the respective relief ports 256, 258, are shut off by the control piston 190 and the free piston 266 as described above, the working fluid in the pressure chamber 262 is increased in pressure according to the movement of the input piston 182 and the control piston 190, and in keeping with this, the free piston 266 moves toward the master cylinder to increase the working fluid of the pressure chamber 264 in pressure. A braking force is generated on the basis of the pressure. A pair of springs is provided between the input piston 182 and the control piston 190 and the positional relationship of the input piston 182 and the control piston 190 is held in a neutral position by the springs in a state of non-operation of a brake.

[Assembling of the Motor Control Unit 300]

Figure 4:
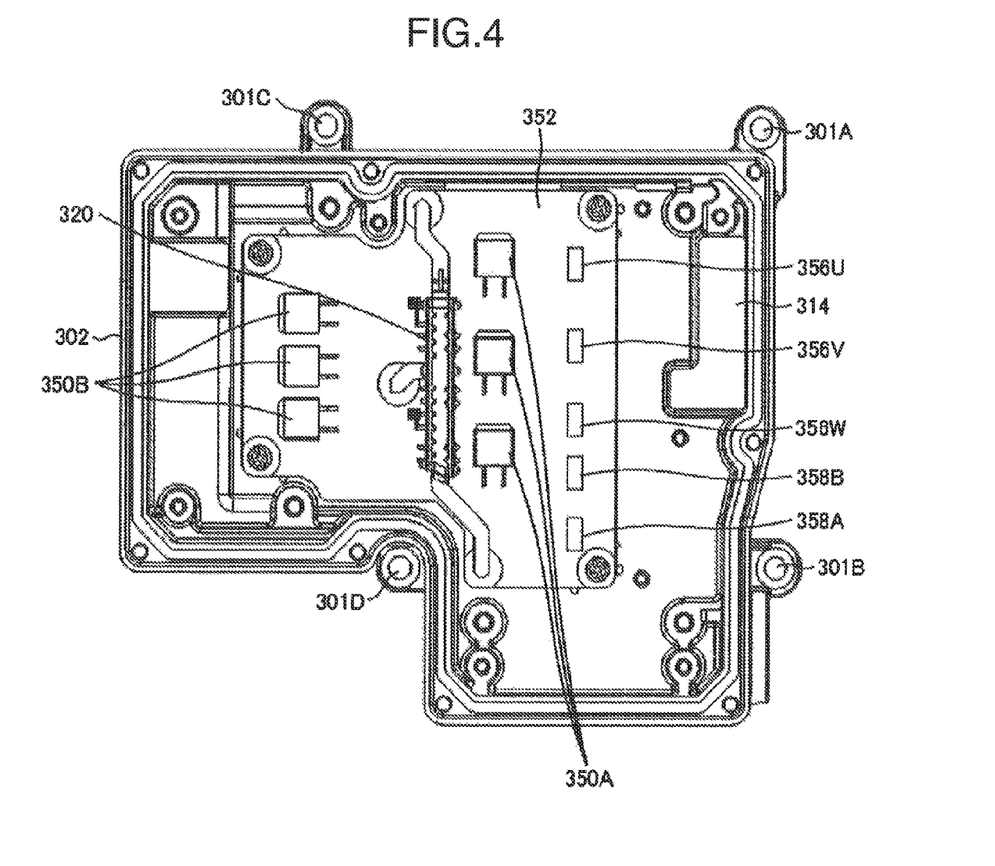
FIG. 4 is a view of a power substrate of a motor control unit, mounted.

As shown in FIGS. 1 to 3, the motor control unit 300 is fixed to the holding base 170 provided on the housing 160 of the moving mechanism 200. Subsequently, referring to FIGS. 4 to 11, the construction and the manufacturing method of the motor control unit 300 will be described. As shown in FIG. 4, a power substrate 352 is fixed to the case 302 of the motor control unit 300. The case 302 is metallic and has a bottom, an upper part thereof is opened for assembly of electrical parts, and fixation members 301A to 301D are provided on an outer periphery of the bottom of the case 302 to serve for fixation of the case 302 to the housing 160 of the moving mechanism 200. In the embodiment, since fixation is accomplished by screws, the fixation members 301A to 301D comprise a leg having a threaded hole.

The fins 312 for heat radiation are formed partially on an outer peripheral surface and a bottom surface of the case 302 of the motor control unit 300. The case 302 is formed on a bottom thereof with a hole 314, through which ac power is fed to the motor and an output signal of the resolver 280 mounted inside the housing 160 is received. While not shown in FIG. 4, the case 302 is provided on a side thereof with a hole, to which a connector for delivery of dc power and signals is mounted.

First in a process of assembly, the power substrate 352 is arranged so as to interpose a heat radiating grease between it and an inside bottom of the case 302, and the power substrate 352 is fixed to the bottom surface of the case 302 by screws. On the power substrate 352, semiconductor devices 350A, 350B, which constitute an inverter circuit for conversion of dc power into ac power are mounted. The semiconductor device 350A comprises a power switching semiconductor acting as U-phase, V-phase, and W-phase upper arms of the inverter circuit and the semiconductor device 350B comprises a power switching semiconductor acting as U-phase, V-phase, and W-phase lower arms of the inverter circuit. While those semiconductor device, which constitute upper and lower arms of the inverter, are six in number, power switching semiconductors with the respective arms in parallel connection will do in case of a large current, and in case of two parallel connections, twelve power switching semiconductors constitute an inverter circuit. The power substrate 352 is provided with dc terminals 358A, 358B for reception of dc power. Also, the power substrate includes U-phase, V-phase, and W-phase ac terminals 356U, 356V, 356W, from which ac power created by the dc power is output. The power substrate 352 is provided with a lead frame 320, through which a drive signal from a control substrate described later is supplied to the semiconductor devices 350A, 350B, which constitute the inverter circuit. Addition of the drive signal to the semiconductor devices 350A, 350B of the respective arms causes the respective semiconductor devices to perform a switching operation to convert dc power into ac power. The lead frame 320 serves as not only transmission of the drive signal but also connection of signal conductors among the respective substrates.

Figure 5:
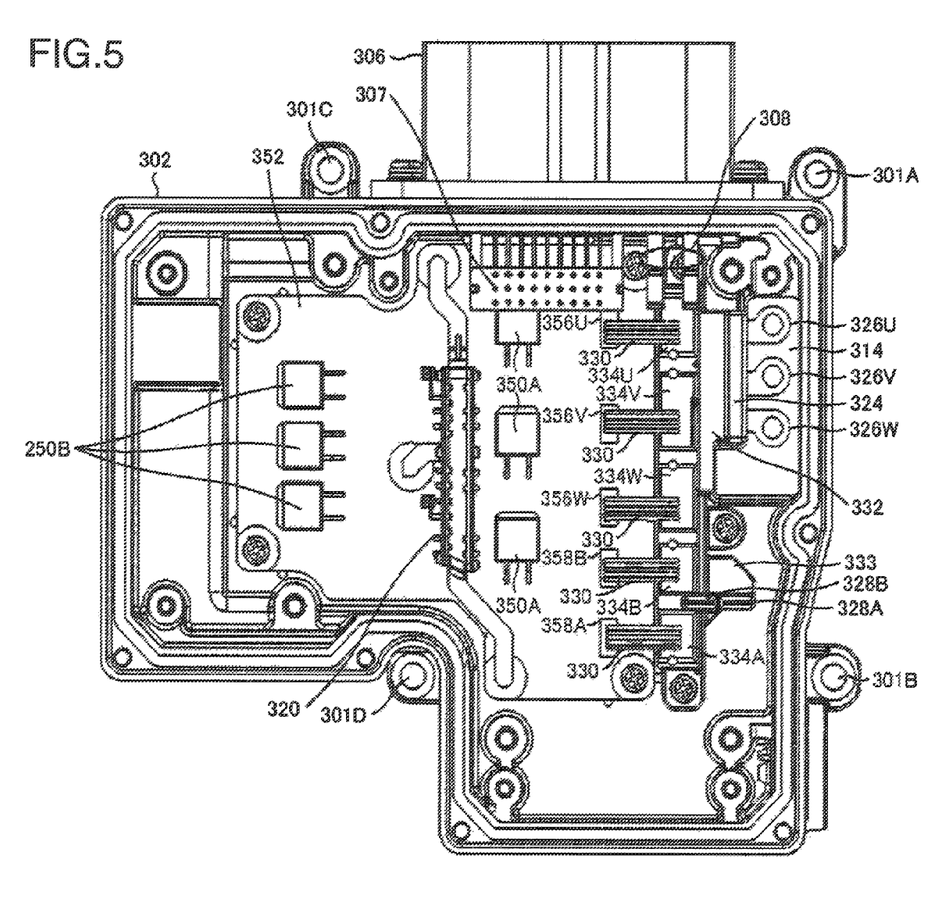
FIG. 5 is a view of a power terminal member mounted on the power substrate of the motor control unit.
Figure 6:
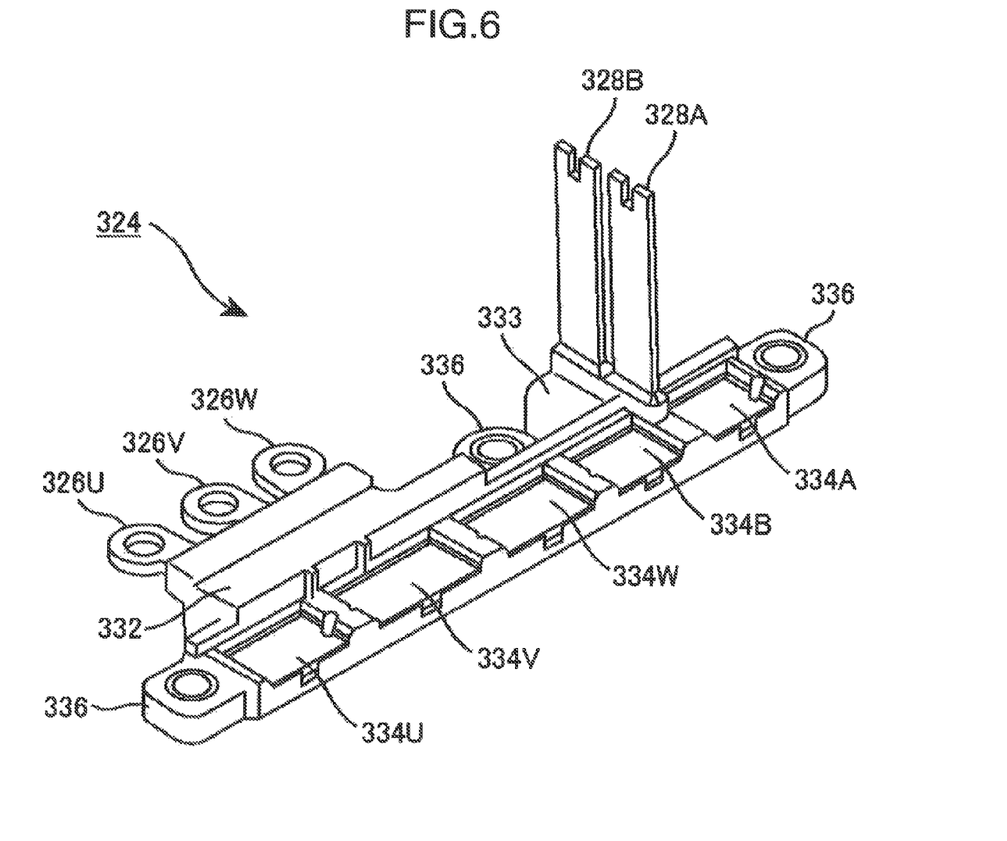
FIG. 6 is a view showing an appearance of the power terminal member.

As shown in FIG. 5, in a subsequent process, a power terminal member 324 for delivery and reception of do power and ac power is mounted to the case 302 of the motor control unit 300 with the power substrate 352, shown in FIG. 4, mounted thereto. FIG. 6 shows details of the structure of the power terminal member 324. The power terminal member 324 includes do input terminals 328A, 328B for reception of do power from a smoothing capacitor described later, do output terminals 334A, 334B, from which the do power as input is output to the power substrate 352, ac input terminals 334U, 334V, 334W for reception of ac power as generated in the power substrate 352, ac output terminals 326U, 326V, 326W, from which the ac power as input is supplied to the motor, and fixation portions 336 for fixation to the case 302. The power terminal member 324 is structured to have a conductor embedded in a resin and includes a resin output port 332, by which the ac input terminals 334U, 334V, 334W are held, and a resin input port 333, by which the dc input terminals 328 are held.

The power terminal member 324 is fixed to the bottom surface of the case 302 and then the dc output terminals 334A, 334B of the power terminal member 324, respectively, are connected to the do terminals 358A, 358B of the power substrate 352 by means of wire bonding 330. Also, the ac terminals 356U, 356V, 356W of the power substrate 352, respectively, are connected to the ac input terminals 334U, 334V, 334W of the power terminal member 324 by means of wire bonding 330. Subsequently, the connector 306 connected to an outside for delivery and reception of electric power and signals is fixed to a side opening of the case 302. The connector 306 includes a power terminal 308 for reception of do power and a signal terminal 307 for delivery and reception of signals. The signals include a communication signal of a local network for reception of control commands and for transmission of state information, and a signal for reception of state information from sensors. While electrical connection of the power substrate 352 and the power terminal member 324 is accomplished by means of the wire bonding 330 in the structure described above, the connection may be accomplished by means of welding with the use of a bus bar.

Since the ac output terminals 326U, 326V, 326W for supplying of ac power to the motor are provided on the vehicle interior side and the ac terminals 356U, 356V, 356W are arranged on a side of the power substrate 352 toward the vehicle interior, electrical parts are arranged efficiently in the case 302. Also, wirings of ac power are made short. In the embodiment, there is produced an effect that the use of the power terminal member 324 decreases a space for wiring. Since the motor control unit 300 and the motor are connected together through the hole 314, the arrangement is less influenced by noise and immune to the influence of dirt from outside, for example, the influence of an antifreezing agent on road. Further, since the ac output terminals 326U, 326V, 326W are provided on the vehicle interior side and the connector 306 is mounted to a side of the hydraulic pressure control mechanism 150 in a direction along an axis of the input piston, the power terminal 308 of the connector 306 can be positioned on a side of the power substrate 352 toward the power terminal, so that the electrical wiring relationship is made easy to lead to miniaturization of the motor control unit 300. Further, since the lead frame 320 is used, connection is made easy.

Figure 7:
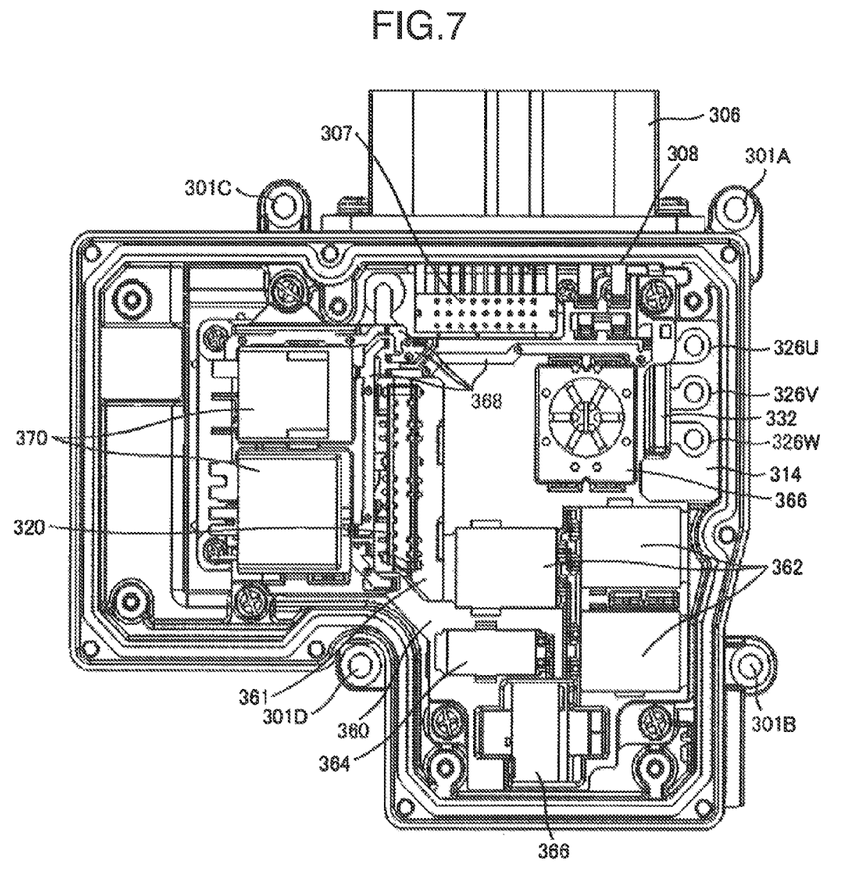
FIG. 7 is a view of an electric source substrate of the motor control unit, mounted.

After the process of assembly shown in FIG. 5, an electric source substrate 360 is mounted as shown in FIG. 7. On the electric source substrate 360, a smoothing capacitor 362 and a noise filter part 366, which includes a filter capacitor 364 and serves for removal of noise are mounted. Further, a dc bus bar for transmission of dc power is mounted and a relay 370 for protection is mounted. The dc bus bar of the electric source substrate 360 is connected to the power terminal 308 of the connector 306 by means of welding, and the relay 370 and the capacitor 362 are connected to the dc bus bar. Also, the electric source substrate 360 includes an opening 361 and the lead frame 320 is connected to the control substrate thereabove through the opening 361.

The electric source substrate 360 is constructed such that the capacitor 362 and the relay 370 are arranged horizontally to have outer surfaces thereof held by the electric source substrate 360. During the traveling of a vehicle, vibrations act on the motor control unit 300 at all times, but that construction, in which the outer surfaces of the capacitor 362 and the relay 370 are held by the electric source substrate 360, produces an effect of enabling reducing concentration of stress, which accompanies the vibrations, on the terminals, so that elongation in service life and an improvement in reliability are achieved. Also, the height is restricted and the motor control unit 300 is restricted in heightwise dimension.

Figure 8:
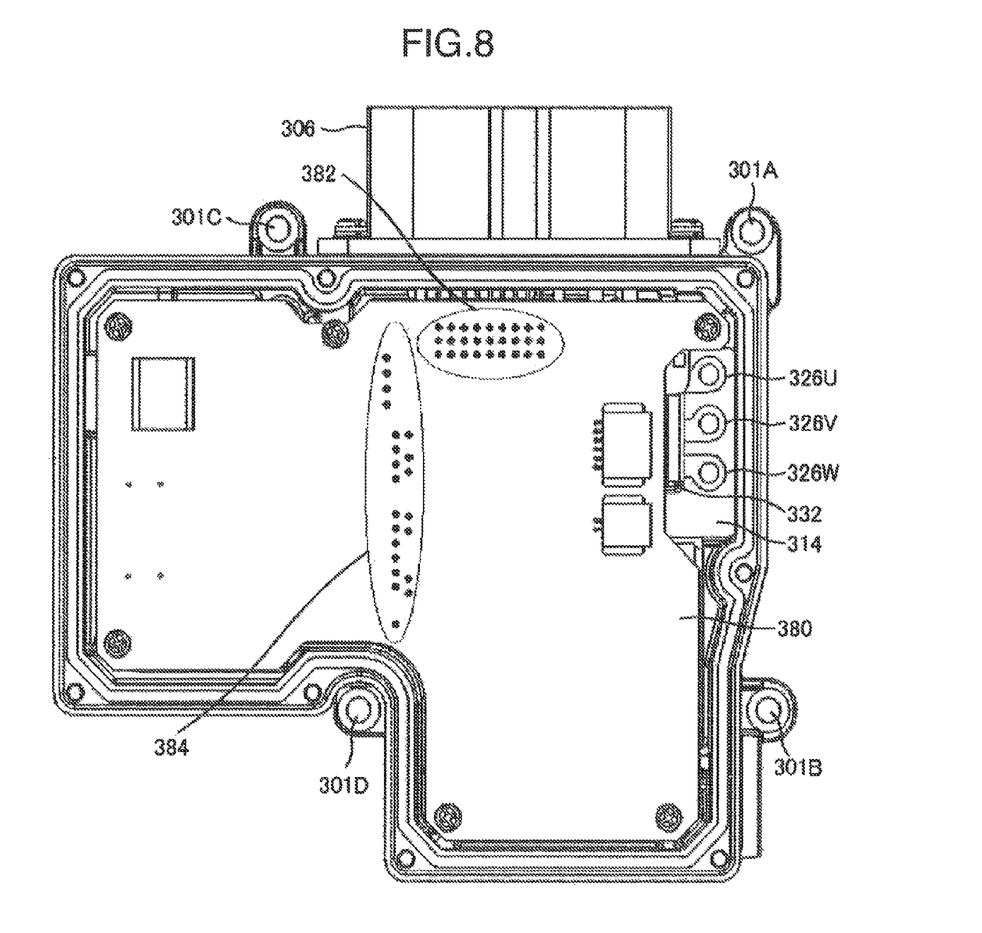
FIG. 8 is a view of a control substrate of the motor control unit, mounted.

FIG. 8 shows a state, in which the control substrate 380 is mounted after the process of assembly shown in FIG. 7. While not shown in the drawing, on the control substrate 380, a control circuit including a computer and creates a control signal for driving of an inverter is mounted. In order to simplify wiring between the substrates, connecting pins in a vertical direction are provided on the signal terminal 307 of the connector 306 to be connected to the connector at a connection part 382 of the control substrate 380 by means of soldering and to be connected to the terminal of the lead frame 320 by means of soldering. Also, notches are provided in positions opposed to the ac output terminals 326U, 326V, 326W to enable screwing the ac output terminals 326U, 326V, 326W. Since connection of the control substrate 380 to another substrate, for example, the power substrate 352 is made by the lead frame 320, wiring is easy to make and an improvement in productivity is achieved. Further, troubles in wiring are decreased to achieve an improvement in reliability. Also, since the control substrate 380 and the connector 306 are connected together by the connecting pins, which are connected to the connector, at the connection part 382, an improvement in productivity is achieved in this respect.

Figure 9:
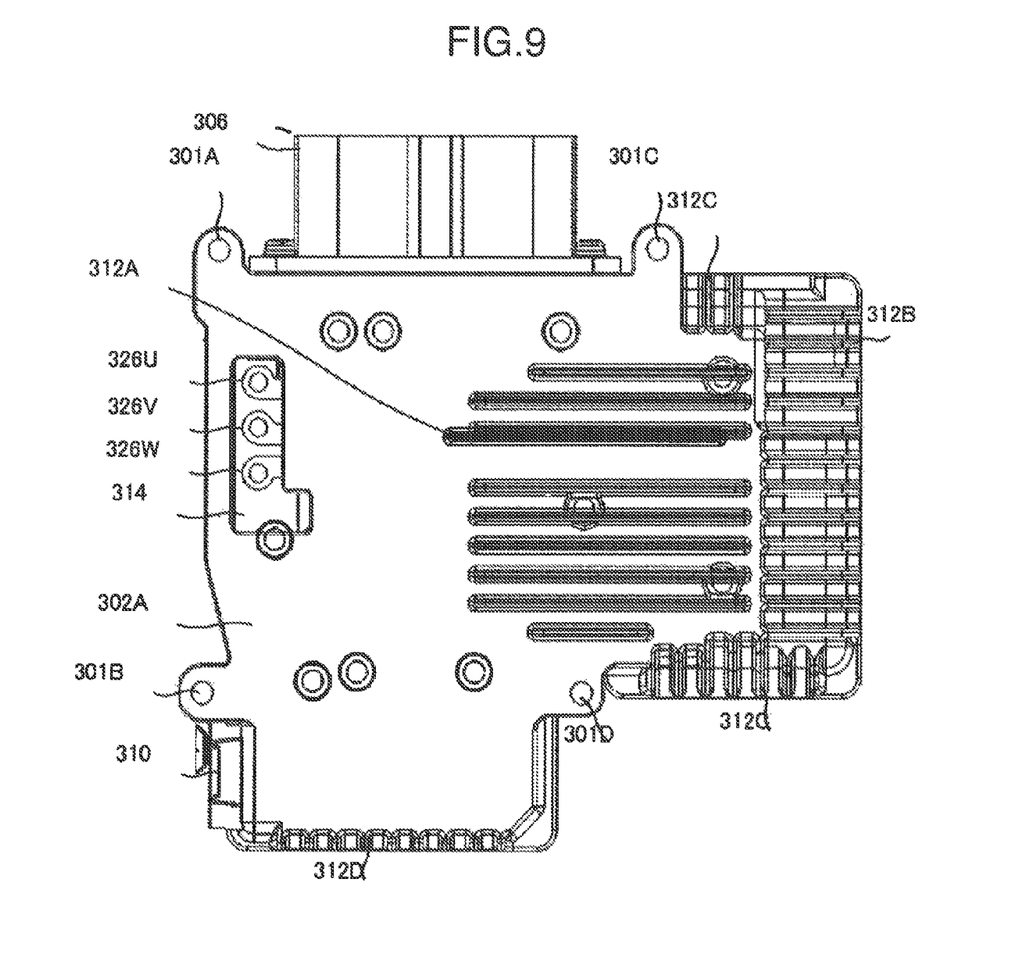
FIG. 9 is a view showing a configuration of a rear surface of the motor control unit.

FIG. 9 is a view of the motor control unit 300 as viewed from a bottom surface thereof. The metal case 302 is formed on a rear surface 302A thereof with the hole 314, through which ac power is fed to the motor. Also, fins 312A, 312B, 312C, 312D for cooling are formed on the rear surface 302A of the case 302. The holes 301A to 301D are ones, through which screws fix the motor control unit 300 to the housing 160. A filter 310 is one, which removes dirt contained in an air, which the motor control unit 300 breathes. The fins 312A, 312B operate to create an air flow in a space between them and the master cylinder 250 in a direction of rod axis of the hydraulic pressure control mechanism 150, in addition to an cooling operation, and grooves of the fins 312 are oriented in a direction along an axis of the input piston of the hydraulic pressure control mechanism 150.

Figure 10:
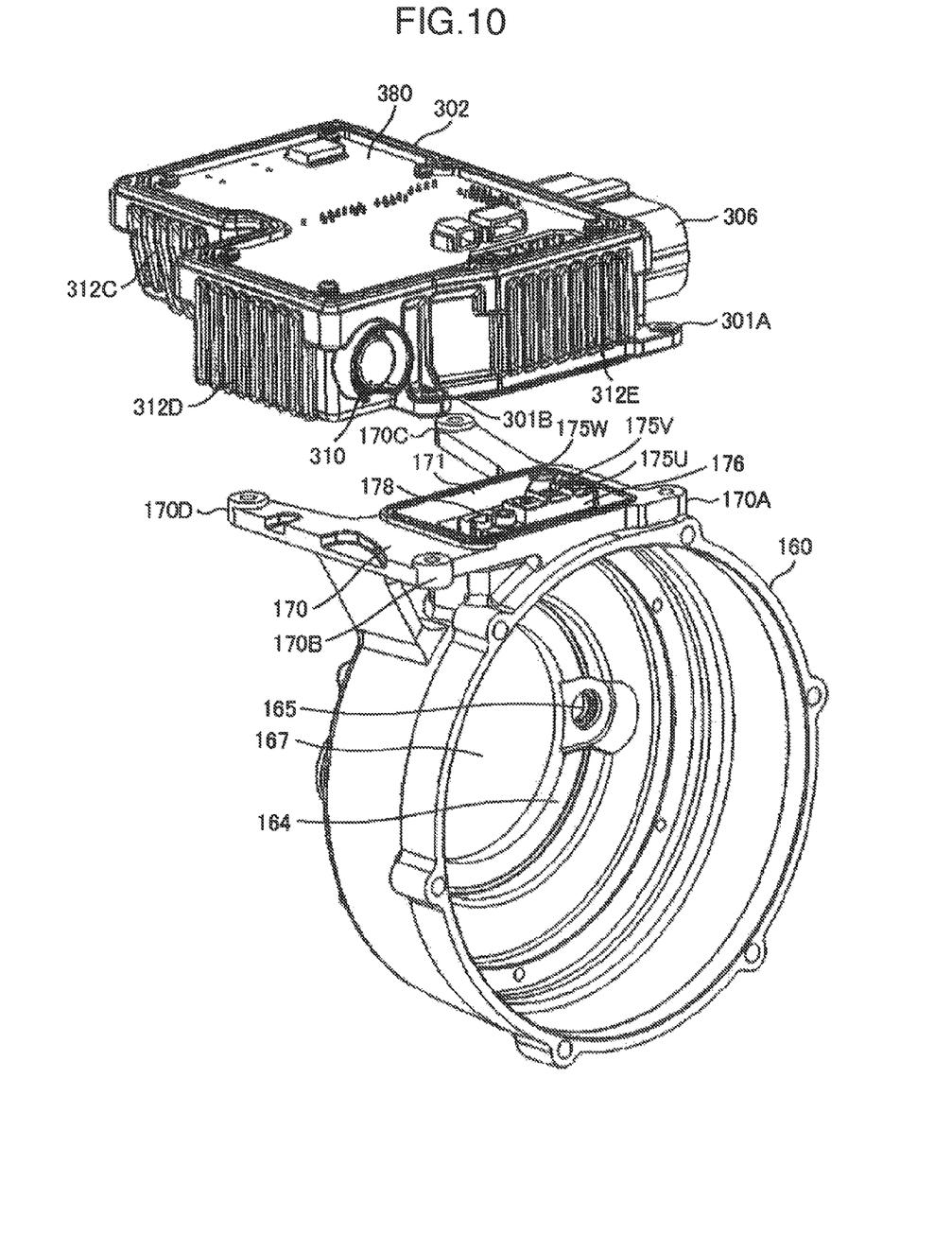
FIG. 10 is a view illustrating a state, in which the motor control unit is mounted.
Figure 11:
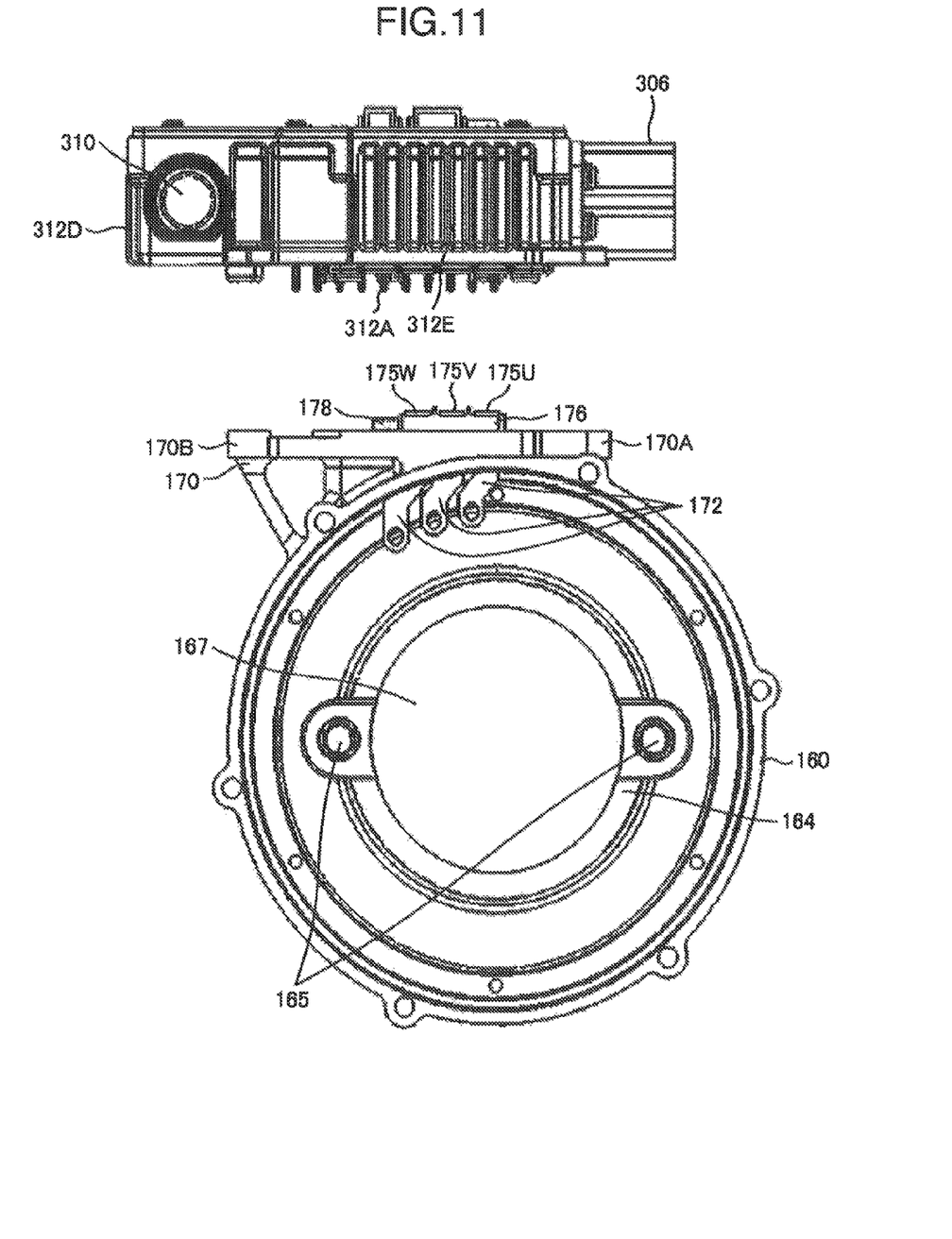
FIG. 11 is a view illustrating a state, in which the motor control unit is mounted.

FIGS. 10 and 11 are views illustrating the process of fixing the case 302 of the motor control unit 300 to the housing 160. Under ordinary circumstances, the piston and the moving mechanism 200 and besides the master cylinder 250 have been mounted on the housing 160, but a state, in which the piston, the moving mechanism 200 and the master cylinder 250 are removed, is shown in FIGS. 10 and 11 so as to help the understanding of that construction, in which the case 302 and the housing 160 are mounted. The housing 160 is provided with the holding base 170, which supports the case 302 of the motor control unit 300. The holding base 170 is formed with an opening 171, and an ac terminal holding member 176 made of a resin is provided in the opening 171. A three-phase ac bus bar 172 is embedded in the ac terminal holding member 176 to have ac terminals 175U, 175V, 175W, which constitute one-end terminals of the bus bar 172, arranged on an upper surface thereof. The other side of the bus bar 172 is connected to the stator winding of the motor. Also, a signal conductor supporting member 178 is provided in juxtaposed alignment with the ac terminal holding member 176 to support the signal conductors.

The fixation members 301A, 301B, 301C, 301D of the case 302 are fixed to fixation portions 170A, 170B, 170C, 170D of the holding base 170 by screws. Subsequently, the ac output terminals 326U, 326V, 326W, respectively, shown in FIG. 8 are fixed to the ac terminals 175U, 175V, 175W of the holding base 170. Also, connection of the signal conductors for reception of a resolver signal is accomplished. Thereafter, when the lid 304 of the motor control unit 300 is mounted, the brake controller is completed as shown in FIGS. 1 to 3. Owing to the construction described above, it is possible to assemble main parts of the motor control unit 300 in a production line of electronic parts and to mount the assembled motor control unit 300 to the housing 160 of the moving mechanism 200, thus achieving an improvement in productivity. Also, since it is possible to beforehand assemble main parts in a separate production line, an improvement in reliability is achieved.

It should be further understood by those skilled in the art that although the foregoing description has been made on embodiments of the invention, the inventions is not limited thereto and various changes and modifications may be made without departing from the spirit of the invention and the scope of the appended claims.

REFERENCE SIGNS LIST

100: brake controller
150: hydraulic pressure control mechanism
160: housing
170: holding base
180: input rod
182: input piston
190: control piston
200: moving mechanism
250: master cylinder
290: stator
296: rotor
300: motor control unit
352: power substrate
360: electric source substrate
380: control substrate
700: reservoir

The invention claimed is:
1. A brake controller comprising:
a hydraulic pressure control mechanism having a master cylinder, which generates a hydraulic pressure of a working fluid on the basis of an input piston being movable by brake operation and a control piston, a motor, and a moving mechanism for moving the control piston in association with rotation of the motor; and
a motor control unit for controlling rotation of the motor, wherein the motor control unit includes a metal case with a control circuit therein, the metal case is fixed to a housing of the moving mechanism, and, in an axial direction of the input piston, one end of the case is positioned in substantially the same position as that of an end of the moving mechanism and the other end of the case is positioned in substantially the same position as that of an end of the master cylinder, and the motor control unit comprises an AC output terminal, from which AC power is output, and a semiconductor device for generating the AC power, and in a direction of movement of the input piston, the AC output terminal is arranged on a side toward the moving mechanism and the semiconductor device is arranged on a side toward the master cylinder.

2. The brake controller according to claim 1, wherein the motor control unit comprises:
a power substrate arranged on a side toward the moving mechanism to include a semiconductor device for generating ac power;
an electric source substrate arranged on the power substrate to include a relay; and
a control substrate arranged on the electric source substrate.

3. A brake controller comprising:
a master cylinder having pressure chambers;
an input piston, which is axially movable on the basis of brake operation to change the volume of the pressure chamber;
a control piston, which is axially movable to change the volume of the pressure chamber;
a motor for generating rotational torque for moving the control piston;
a moving mechanism for axially moving the control piston on the basis of rotation of the motor;
a motor control unit for controlling rotational torque of the motor; and
a reservoir, which stores working fluid which is to be filled in the pressure chambers, wherein
the motor control unit includes a metal case with a control circuit therein, the metal case is fixed to an outer surface of the moving mechanism, and in an axial direction of the input piston, one end of the case is positioned in substantially the same position as that of an end of the moving mechanism for moving the control piston and the other end of the case is positioned in substantially the same position as that of an end of the master cylinder,
a space is formed between the case and the master cylinder, and an fluid passage is provided on a side of the master cylinder toward the space to permit a working fluid from the reservoir to be supplied, and
the motor control unit comprises an AC output terminal, from which AC power is output, and a semiconductor device for generating the AC power, and in a direction of movement of the input piston, the AC output terminal is arranged on a side toward the moving mechanism and the semiconductor device is arranged on a side toward the master cylinder.

4. The brake controller according to claim 3, wherein a part of the reservoir is arranged in the space formed between the case and the master cylinder.

5. The brake controller according to claim 3, wherein the motor control unit comprises:
a power substrate arranged on a side toward the moving mechanism to include a semiconductor device for generating ac power;
an electric source substrate arranged on the power substrate to include a relay; and
a control substrate arranged on the electric source substrate.

6. A brake controller comprising:
a master cylinder including a first pressure chamber, a second pressure chamber, and a free piston provided between the first and second pressure chambers;
an input piston, which is axially movable on the basis of brake operation to change the volume of the first pressure chamber;
a control piston, which is axially movable to change the volume of the first pressure chamber;
a motor for generating rotational torque for moving the control piston;
a moving mechanism for axially moving the control piston on the basis of rotation of the motor;
a motor control unit for controlling rotational torque of the motor; and
a reservoir, which stores working fluid which is to be filled in the pressure chambers, wherein
the motor control unit is fixed to an outer surface of the moving mechanism, the motor is arranged within the moving mechanism, a space is formed between the case of the motor control unit and the master cylinder, and fins are formed on a surface of the case toward the space, and
the motor control unit comprises an AC output terminal, from which AC power is output, and a semiconductor device for generating the AC power, and in a direction of movement of the input piston, the AC output terminal is arranged on a side toward the moving mechanism and the semiconductor device is arranged on a side toward the master cylinder.

7. The brake controller according to claim 6, wherein a part of the reservoir is arranged in the space formed between the case and the master cylinder.

8. The brake controller according to claim 6, wherein the motor control unit comprises a power substrate arranged on a side toward the moving mechanism to include a semiconductor device for generating ac power, an electric source substrate arranged on the power substrate to include a relay, and a control substrate arranged on the electric source substrate.

* * * * *